United States Patent [19]  [11] Patent Number: 4,782,442
Kojima et al.  [45] Date of Patent: Nov. 1, 1988

[54] TIME-SHARING COMPUTER SYSTEM OPERABLE IN A HOST TSS MODE AND A TERMINAL TSS MODE

[75] Inventors: Tomihiko Kojima, Machida; Hidehiko Akita, Tokyo; Hisashi Hashimoto; Tsutomu Miyairi, both of Yokohama; Yutaro Hori, Katsuta, all of Japan

[73] Assignee: Hitachi, Ltd., Tokyo, Japan

[21] Appl. No.: 1,438

[22] Filed: Jan. 8, 1987

Related U.S. Application Data

[63] Continuation of Ser. No. 542,464, Oct. 17, 1983, abandoned.

[30] Foreign Application Priority Data

Oct. 18, 1982 [JP] Japan .................. 57-181308

[51] Int. Cl.[4] ............................................. G06F 13/00
[52] U.S. Cl. ....................................................... 364/200
[58] Field of Search ... 364/200 MS File, 900 MS File; 235/379, 380; 379/93, 94, 97, 98

[56] References Cited

U.S. PATENT DOCUMENTS

| | | | |
|---|---|---|---|
| 3,976,982 | 8/1976 | Eiseien | 364/900 |
| 3,984,670 | 10/1976 | Erickson et al. | 364/200 |
| 4,091,448 | 5/1978 | Clausing | 364/200 |
| 4,249,163 | 2/1981 | Maurer et al. | 340/169 A |
| 4,314,352 | 2/1982 | Taught et al. | 364/900 |
| 4,321,672 | 3/1982 | Braun et al. | 364/408 |
| 4,355,369 | 10/1982 | Garvin | 364/900 |
| 4,423,287 | 12/1983 | Zeidler | 178/22.08 |
| 4,423,316 | 12/1983 | Sand et al. | 235/379 |
| 4,438,326 | 3/1984 | Ulchida | 235/379 |
| 4,481,574 | 11/1984 | DeFino et al. | 364/200 |
| 4,604,686 | 8/1986 | Reiter et al. | 379/93 X |
| 4,614,841 | 9/1986 | Babecki et al. | 379/98 |
| 4,636,947 | 1/1987 | Ward | 235/379 X |

FOREIGN PATENT DOCUMENTS

| | | |
|---|---|---|
| 58-125281 | 7/1983 | Japan . |
| 58-115673 | 7/1983 | Japan . |
| 59-95669 | 6/1984 | Japan . |
| 2103399 | 2/1983 | United Kingdom . |

Primary Examiner—Raulfe B. Zache
Assistant Examiner—Florin Munteanu
Attorney, Agent, or Firm—Antonelli, Terry & Wands

[57] ABSTRACT

The present invention is directed to time-sharing computer system which includes a host computer system which operates in response to a host TSS command, a terminal computer system which is connected to the host computer system through a line and operates in response to a terminal TSS command, and a plurality of terminals which are connected to the terminal computer system. In this time-sharing system, the data processing in a terminal computer in response to a terminal TSS command input and the subsequent data processing in the host computer system in response to a host TSS command input can be carried out freely when the terminal is in a state of interaction with the host computer, without carrying out an end command of the host TSS a mode exchange operation. For this purpose, the system adopts the concept of a multiplexed TSS, which enables plural sessions to be simultaneously executed by the host computer system and the terminal computer system.

10 Claims, 11 Drawing Sheets

FIG. 6

```
:
hostname = host |
temp =
for op do
    hstnm = `hfnm -h sdl $OP`
    if test $hstnm && test .%$OP -f $OP ; then
        /bin/cp $OP .%$OP
        temp = exist
    fi
done
vl $*
for op do
    hstnm = `hfnm -h Sdl $OP`
    if test $hstnm && test .%$OP ; then
        diff -e .%$OP $OP > .q .diff.out
        if test $? != 0 ; then
            echo q >> .%.diff.out
            if test `expr $hstnm : ""` = 1 ; then
                /VOS3TSS/CALL '"U27HHO.PWB.LOAD(FEDIT)'" "'$hstnm'"
            else
                /VOS3TSS/CALL '"U27HHO.PWB.LOAD(FEDIT)'" "'$hstnm'"
            fi
            cat .%.diff.out : $hostname
            cat .%.diff.out
        fi
    fi
done
if test $temp ; then
    /bin/rm .%*
fi
```

FIG. 7

601 —
```
      write (6, 100)
  100 format (1h,'*test program*')
      stop
      end
```

602 —
```
      write (6, 50)
   50 format (1h,'*new version*')
      write (6, 100)
  100 format (1h,'*test program*')
      end
```

603 —
```
  q diff - e test1.f test2.f
  3d
  0a
      write (6, 50)
   50 format(1h,'*** new version***')
```

FIG. 9

```
hostname = host1
if test $# -lt 2 ; then
      echo arg count
      exit 1
fi
last = `necho '$' '$' $*`
hst2 = `hfnm $last`
if test $hst2 ; then
        if test $#!=2 ; then
                echo cannot copy
                exit 1
        fi
        cp $*
        hst1 = `hfnm $1`
        if test $hst1 ; then
                /VOS3TSS/COPY   "$hst1" "$hst2"
        else
                /VOS3TSS/CREATE "DATASET($hst2)"
                                'DLM(**EOF)'
                cat $1 : $hostname
                echo '**EOF' : $hostname
        fi
else
        cp $*
fi
```

```
% LISTDS vosc.data m
U27TKO. VOSC. DATA
--RECFM-LRECL-BLKSIZE-DSORG-CREATED---EXPIRES---SECURITY-
   FB    80    6160     PO  09/02/81 00/00/00   SAFE
  --VOLUMES--
   USER18
  --MEMBERS--
   CODEE
   CODEH
   CODEV
   CODEV1
   DEMO
   DEMOOHP
   GEVTRV
   JCLCC
   JCLCCH
   JCLCD
   JCLTRC
   LINKC
   LOGON
   MACGHO
   MCC*WORK
   PRC1
   RJEUNIX
   TEMP
   TEMPNAME
   TEMP4
   TSP4001
```

902

```
% LISTDS vosc.data mlsed 'l.6d' lnum
    1    CODEE
    2    CODEH
    3    CODEV
    4    CODEV1
    5    DEMO
    6    DEMOOHP
    7    GEVTRV
    8    JCLCC
    9    JCLCCH
   10    JCLCD
   11    JCLTRC
   12    LINKC
   13    LOGON
   14    MACGHO
   15    MCC*WORK
   16    PRC1
   17    RJEUNIX
   18    TEMP
   19    TEMPNAME
   20    TMP4
   21    TSP4001
```

TIME-SHARING COMPUTER SYSTEM OPERABLE IN A HOST TSS MODE AND A TERMINAL TSS MODE

This is a continuation of application Ser. No. 542,464, filed Oct. 17, 1983, now abandoned.

BACKGROUND OF THE INVENTION

This invention relates to a method and an apparatus for controlling a time-sharing computer system and a computer system to which instructions are given through commands.

In a time-sharing system (hereinafter, referred to as a TSS) of a computer, good human-interface is required. It is required that the work-efficiency of the workers who use the TSS terminals be as high as possible and that the workers be able to work with a comfortable man-machine interface.

In conventional general purpose large computer systems, in order to raise the processing efficiency of the computer system, the system control is performed on the basis of the operating system (computer control program) by regarding the computer hardware as the main resource, rather than the brains, eyes, and hands of the workers. Therefore, in the work of a TSS in which the work-efficiency of the workers is significant, there may be a case where the workers must wait for the operation of the computer, so that there is a problem in that the work efficiency cannot be improved as desired.

In text editing, which is a typical job to be executed by the TSS, there are many simple jobs, such as a data processing in which, for example, the source program is inputted one character at a time from a terminal to a TSS file, and a series of characters in a file is replaced by another series of characters, or the like. Even such simple processings, if the processings are simultaneously required by many TSS terminal users, causes the ability of a large computer to be used so-called minutely, so that the great computing power that is peculiar to large computers is not sufficiently utilized and there may be a case where the response to TSS commands becomes slow.

In addition, the easiness of operations involving files is important in the TSS. In the operating system of the general purpose large computer which has to cope with various duties, such as business calculations, scientific calculations, on-line system tasks, etc., the more complicated and various file constructions must be supported to meet the requirements for high-speed processing, easiness of constitution of the user system, or the like. This adversely results in deterioration of the easiness of operations involving files in the TSS.

These problems occur since there is always an inconsistency between the software architecture which gives priority to the processing efficiency of a computer and the software architecture which gives priority to the work efficiency of the workers. It is impossible to solve all of such problem in a single computer system.

To solve such problems, an idea a system of the function distribution type has been proposed in which a computer system which can make the most of the great data processing ability of the large computer is used as a host system, and a computer system which is suitable for the TSS of which the text processing and man-machine control processing are done efficiently is used as a terminal system.

As a conventional system of this kind, the following methods are available.

(1) Remote batch coupling method

In this method, the terminal computer used only for the TSS and the large host computer used mainly for batch processing are connected through a communication line; the work which requires the interaction with a man, such as text editing, data preparation, etc., is executed using the TSS of the terminal computer; when the great computing ability of the large computer is needed, the program and data are sent to the host computer by the remote job entry system for allowing the host computer to carry out the batch processing, and the execution result is again returned to the terminal computer side, whereby the result may be observed and checked by the workers at the TSS terminals.

This method has an advantage in that the human work-efficiency can be raised since the operating system only for use of the TSS which gives priority to the human-interface is used as the terminal computer.

However, this method has a problem in that the large host computer cannot be used interactively. Namely, the host computer cannot be used in the interactive mode by means of the TSS terminal of the terminal computer. Therefore, the interactive software to be executed by the host computer, such as, e.g. the interactive debugger cannot be used by the TSS terminal of the terminal computer. Furthermore, there is also a problem in that it is impossible to access the data base of the host computer systems by interaction from the TSS terminal.

(2) Transparent host TSS method

In this method, the host computer and the terminal computer are connected through the TSS line, and by changing over the mode, the TSS of the host computer and the TSS of the terminal computer can be individually used by one TSS terminal connected to the terminal computer, respectively. That is, while the TSS of the terminal computer is being used, when a particular TSS command is inputted, the mode enters the host command input mode, so that the command inputted from the TSS terminal is directly sent to the host computer, where it is executed. The execution result of the host computer is outputted to the TSS terminal of the terminal computer. Inputting another particular command now allows the mode to again return to the command input mode of the TSS of the terminal computer.

Instead of the above method whereby the modes of the host computer TSS and the terminal computer TSS are switched over by inputting a particular command, another method is also available, whereby when a particular symbol is added to the head of the TSS command, this command is executed as a command of the terminal computer TSS, and when no particular symbol is added, that command is sent to the host computer for permitting the TSS of the host computer to execute it.

Even when either of these methods is adopted, problems result, in that, although the host computer can be used interactively, the host computer TSS and the terminal TSS require different interactive languages, and both systems can be merely individually used, or the like, so that the method of utilizing both TSS commands by combining them is impossible. In addition, there is also a problem in that the handling is complicated since the method of the host computer TSS and that of the terminal computer TSS are different.

(3) Intelligent TSS terminal method

As a method of distributing the processings by the host computer to the terminal side, a method is known whereby the intelligent terminal, microcomputer, and personal computer are used as the TSS terminal and part of the processings, such as text editing and the like, is completely locally carried out by the TSS terminal. This method is fundamentally identical to the method (2) although the hardware construction is slightly different from that of the above-mentioned method (2). That is to say, in this method, the mode in which the host computer is used and the mode in which the microcomputer equipped in the TSS terminal is used are separated, and both of them are individually used in the interactive mode, respectively. Therefore, the same problems occur as in the method (2).

SUMMARY OF THE INVENTION

It is an object of the present invention to solve such problems, as described above and to provide a TSS control method by which the host computer and the terminal computer (or the computer and the information processor to be coupled thereto) can be used simultaneously and in a multiplexing manner as an interactive system, and wherein the commands for both computers can be used by combining them, whereby both computers can be accessed from a common man-machine interface. At the same time, the response speed of the computer to the command input and the interactive ability with the computer are improved, thereby providing more efficient use of the computer system.

That is to say, the present invention provides a method and an apparatus for controlling a time-sharing computer system in a distributed computer system which consists of a computer system having a command system and an information processor system having a command system, wherein this method comprises the steps of: producing a series of character, to produce a command for the computer on the side of that information processor; and accessing both the command system of the computer and the command system of the information processor from a common command interface, and wherein the computer command and a command for the above information, processor can be used in combination by integrating the command language.

BRIEF DESCRIPTION OF THE DRAWINGS

FIG. 6 is a diagram showing an example of the command procedure for a terminal text editor to automatically update the files on the host side on the basis of the difference between the new and old files according to the present invention;

FIG. 7 is a diagram showing an example to use a command to extract the difference between the new and old files according to the present invention;

FIG. 9 is a drawing showing an example of a method of defining a file copy command by which both host TSS file and terminal TSS file can be handled according to the present invention;

FIG. 11 is a diagram showing an example of a use method of a pipeline coupling function when the VOS3 TSS is used as the host computer TSS and the UNIX is used as the terminal computer TSS according to the present invention.

DESCRIPTION OF THE PREFERRED EMBODIMENT

Figure 1:
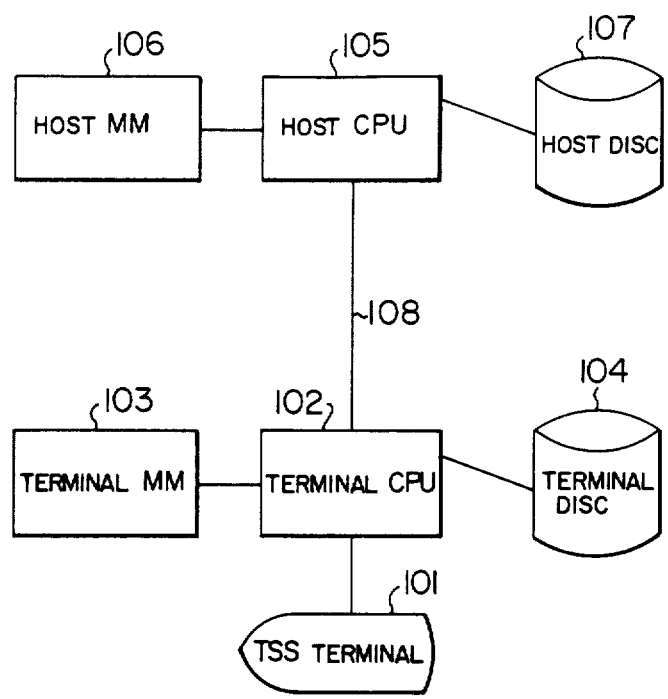
FIG. 1 is a constructional diagram of an example of a computer system according to the present invention.

The fundamental concept of the present invention will be first described.

In the TSS, more intelligent work is done by the human brain than the computer. Rather the computer is used as an assistant to a human, i.e., as a tool for the operator. Therefore, in order to raise the work efficiency of the operator, it is necessary to remove the distinction between the terminal mode and the host mode so that the operator can input instructions to the computer any time. For this purpose, the present invention adopts the concept of "multiplexed TSS".

Now, the term "multiplexed" of the expression multiplexed TSS means that the host TSS and the terminal TSS can be multiplexed in use, i.e. one terminal is concurrently used as the terminals for two TSSs. Another meaning of the expression multiplexed TSS is that interaction with a plurality of host computer systems may be simultaneously effected and that a plurality of TSS sessions of one host computer are bound by the terminal computer software and are simultaneously used. The concept of the multiplexed TSS is that a person (terminal operator) is a main resource and a computer is rather a peripheral device, thereby creating an environment in which the terminal operator can do multitasking without making the operator wait for the computer.

In this case, there are two significant benefits.

One benefit is that even when any TSS is used, it can be used by the same advanced man-machine interface. The other is that a plurality of TSSs can be used not only independently of each other, but also in combination with each other. That is to say, an integrated TSS environment can be realized.

For the different TSSs, the command set and user programs which are supported therein are not identical; if two TSSs can be used, the number of commands and user programs will generally increase. However, it will be inconvenient if quite different methods are needed to do simply the same things and if it is necessary to study two different methods of use of the TSS. Even in the case where the numbers of commands and user programs increase, it will be convenient if the command interfaces of both TSSs are matched and only one method of use may be studied for common commands. For this purpose, it is necessary that a command analyzer (program to analyze the command language) which is common to both commands for the host TSS and commands for the terminal TSS and that the command procedure can be, accordingly, described by the same language (however, the commands of both TSSs may exist mixedly in the command procedure).

The text editor (text edit program) and file operation commands (commands for copy or erase of files, display of a list of file names, change of file names, etc.) are fundamental in use of the TSS, and they are present commonly in any TSS. For such a command group, the host file and terminal file should be able to be operated by studying only one kind of operations.

The meaning that the host TSS and terminal TSS can be used in combination therewith includes the possibility that an output of the host TSS (or terminal TSS) command can be sent as input data of the terminal TSS (or host TSS) command, and that the command procedure in which both TSS commands are mixed can be executed. Not only that the reception and transmission of the data between both TSSs can be performed via files, but also it should be able to do that by means of such a mechanism (pipe line) that the data can be directly received and transmitted from command to command. It is desired that the terminal TSS can be executed in the foreground while the host TSS command is being executed in the background, and vice versa.

Similarly, in the cases where the conversation with a plurality of host systems is simultaneously effected and where a plurality of TSS sessions of the host are simultaneously used, it is important that they can be used by the common advanced man-machine interface and by combining them.

It is the fundamental concept of the present invention that a construction to enable these is introduced for allowing the brain, eyes and hands of a person (terminal operator) to be fully utilized, thereby improving the general performance of the man-machine system and at the same time realizing the man-machine interface with an excellent operability by making the best use of the capabilities of the terminal computer.

The present invention has main characteristics with respect to the following items.

(1) Multiplexed TSS controlling method

The TSS of the host computer and the TSS of the terminal computer can be used simultaneously and in a multiplexing manner from the side of the TSS terminal connected to the terminal computer, and both TSSs can be identified and can be used as an integrated system by combining them.

(2) Method of providing a common interactive interface between the host TSS and the terminal TSS The command interface with an excellent operability can be provided on the terminal computer side independently from the interactive language of the host computer using the high intelligence of the terminal computer, and the common interactive interface can be used for both TSSs of the host and terminal.

(3) Method of coupling the host TSS and terminal TSS by a pipeline

It is possible to construct and use the TSS command with high-speed response which has a compound function of the host TSS command and terminal TSS command by the mechanism for coupling the TSS command on the host computer side and the TSS command on the terminal computer side by a software pipeline. The execution result of the TSS of the host can be processed in realtime on the terminal side using this function, and it is also possible to simply realize and use the command having a format which was improved so as to meet the specifications desired by the user by extracting only the desired information or by converting it into the preferred format.

(4) Simultaneous interaction with a plurality of host systems

The host computer which can be accessed from the TSS terminal is not limited to one host computer, but it is possible to simultaneously have an interaction with a plurality of host computers. At this time, there is provided a mechanism to automatically determine the destination (one of the host computers) of the command input from the TSS terminal.

By using this characteristic, it is possible to construct the TSS environment in which a number of host computers from a large general purpose computer to a microcomputer can be used on the basis of a common use method.

(5) Simultaneous use of a plurality of TSS sessions

Even if the TSS of the host computer is limited such that one terminal corresponds to one session, by binding the host TSS terminal lines by the terminal computer software, it is possible for one terminal (i.e. one operator) to utilize the host TSS as a plurality of sessions, thereby enabling a plurality of commands to be executed in parallel.

(6) Coexistence with the remote batch

It is possible to coexist with the conventional distributed system of the remote batch coupling type. Even while the job is being transferred to the host computer by the remote job entry system, it is possible to use the TSS of the host computer and the TSS of the terminal computer.

An embodiment of the present invention will now be described hereinbelow with reference to the drawings.

(i) System configuration

FIG. 1 shows a construction of an example of a computer system according to the present invention.

In FIG. 1, a reference numeral 101 denotes a TSS terminal to input commands; 102 denotes a central processing unit (CPU) of a terminal computer for performing data processings; 103 denotes a main memory (MM) of the terminal computer; and 104 denotes a peripheral storage device (secondary memory, e.g. a disc) of the terminal computer. A numeral 105 denotes a central processing unit (CPU) of a host computer for performing data processings; 106 denotes a main memory (MM) of the host computer; 107 denotes a peripheral storage device (secondary memory, e.g. a disc) of the host computer; and 108 denotes a communication line to connect the host computer with the terminal computer. The peripheral storage devices are used to store files, commands, command procedures (procedure described by a command language), and the like to be used by the TSS.

A plurality of TSS terminals 101 and a plurality of communication lines 108 to connect the host computer with the terminal computer may be used in dependence upon the system configuration. In addition, a construction such that a plurality of host computer systems 105, 106 and 107 exist and a construction such that a plurality of terminal computer systems 102, 103 and 104 exist are also possible.

Figure 2:
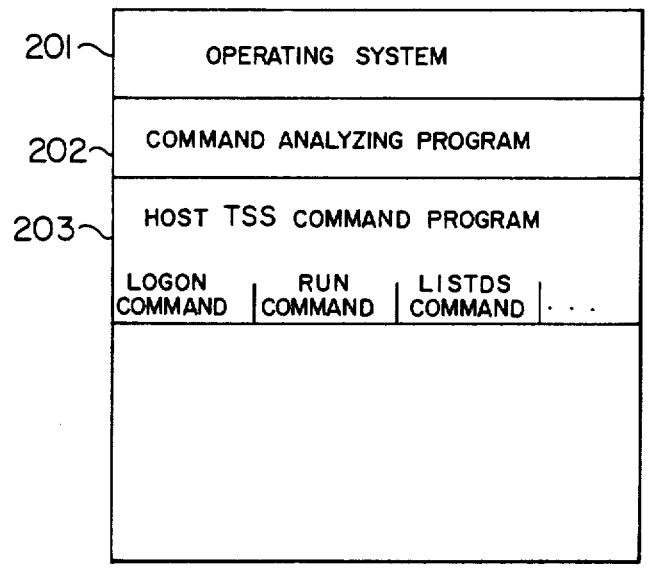
FIG. 2 is a diagram showing an example of a memory map in a main memory of a host computer according to the present invention.

FIG. 2 shows a memory map in the main memory of the host computer. In the drawing, a reference numeral 201 denotes an operating system of a computer (for example, an operating system VOS3: Virtual Storage Operating System 3, of the HITAC M-180 computer); 202 denotes a command analyzing program (e.g. a command analyzing program TMP4: Tss Monitor Program 4, of the VOS3 TSS); and 203 denotes a command program of the TSS.

Figure 3:
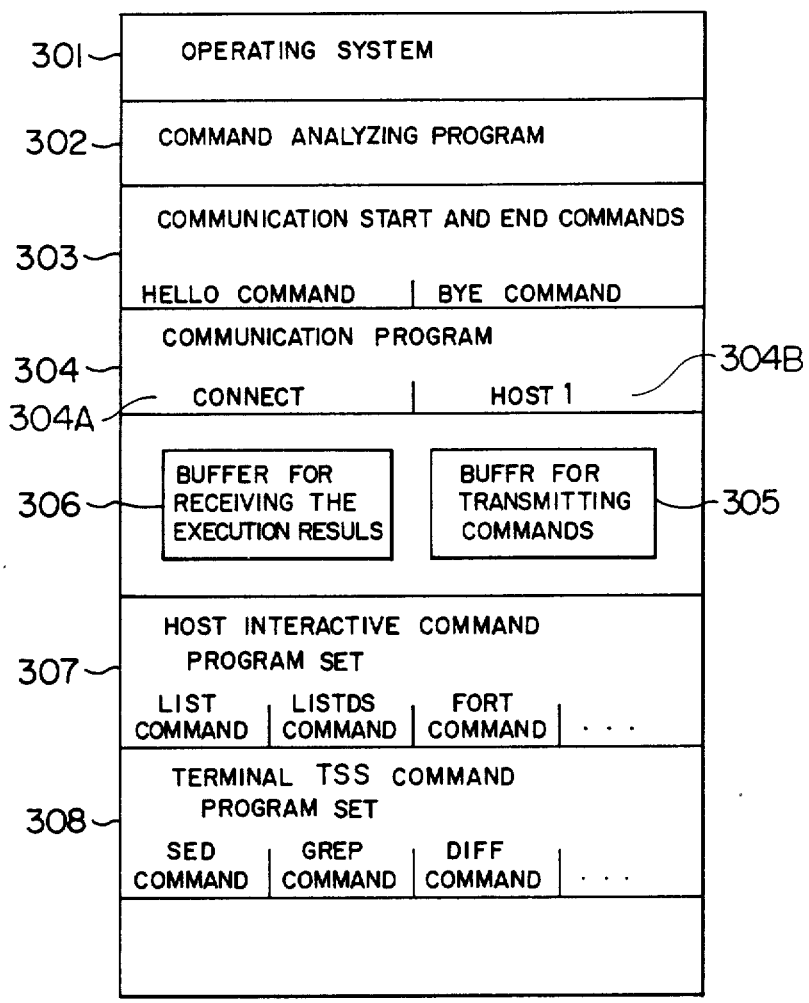
FIG. 3 is a diagram showing an example of a memory map in a main memory of a terminal computer according to the present invention.

FIG. 3 shows a memory map in the main memory 103 of the terminal computer. In the drawing, a reference numeral 301 denotes an operating system of a computer (e.g. a UNIX operating system which functions for the VAX-11/780 computer), and 302 denotes a command analyzing program (e.g. a command analyzing program "shell" of the UNIX TSS). A numeral 303 denotes a command for the terminal user to instruct the beginning and end of the simultaneous use of the TSS of the host computer from the TSS terminal connected to the terminal computer. In this embodiment, a command to begin is called a "hello" command and a command to finish is called a "bye" command. These commands may be specifically executed due to the inputting operation by the terminal user, or there is a case where they are automatically executed in association with the beginning and end of the operation of the TSS of the terminal computer. A numeral 304 denotes a communication program with the host computer to transmit commands (or command procedure) and data, or the like to the host computFbKFbK and to receive the execution result of the command by the host computer TSS and the execution result of the program (the roles of a "connect" program 304A and a "host 1" program 304B which are included in this communication program 304 will be described later).

A numeral 307 denotes commands and command procedure set (hereinafter, these are called host interactive commands) to use the host computer in the interactive mode, and 308 represents a TSS command program set of the terminal computer. There is a similarity between the program groups 307 and 308 with respect to the point that they are executed by the TSS of the terminal computer, i.e. they are executed through the command analyzing programs of the terminal TSS. However, the host interactive commands 307 are the command set having a function to produce the series of command which is desired to be executed by the host computer, and the created series of command is executed by the host computer and its output is sent through the terminal computer to the TSS terminal as an output of the host interactive command. On the other hand, the command group 308 is the TSS command which is executed solely by the terminal computer. Numerals 305 and 306 denote buffer areas to be used upon reception and transmission of the data with the host computer.

(ii) Explanation of the mechanism
(1) Creation of the host interactive commands

Figure 4:
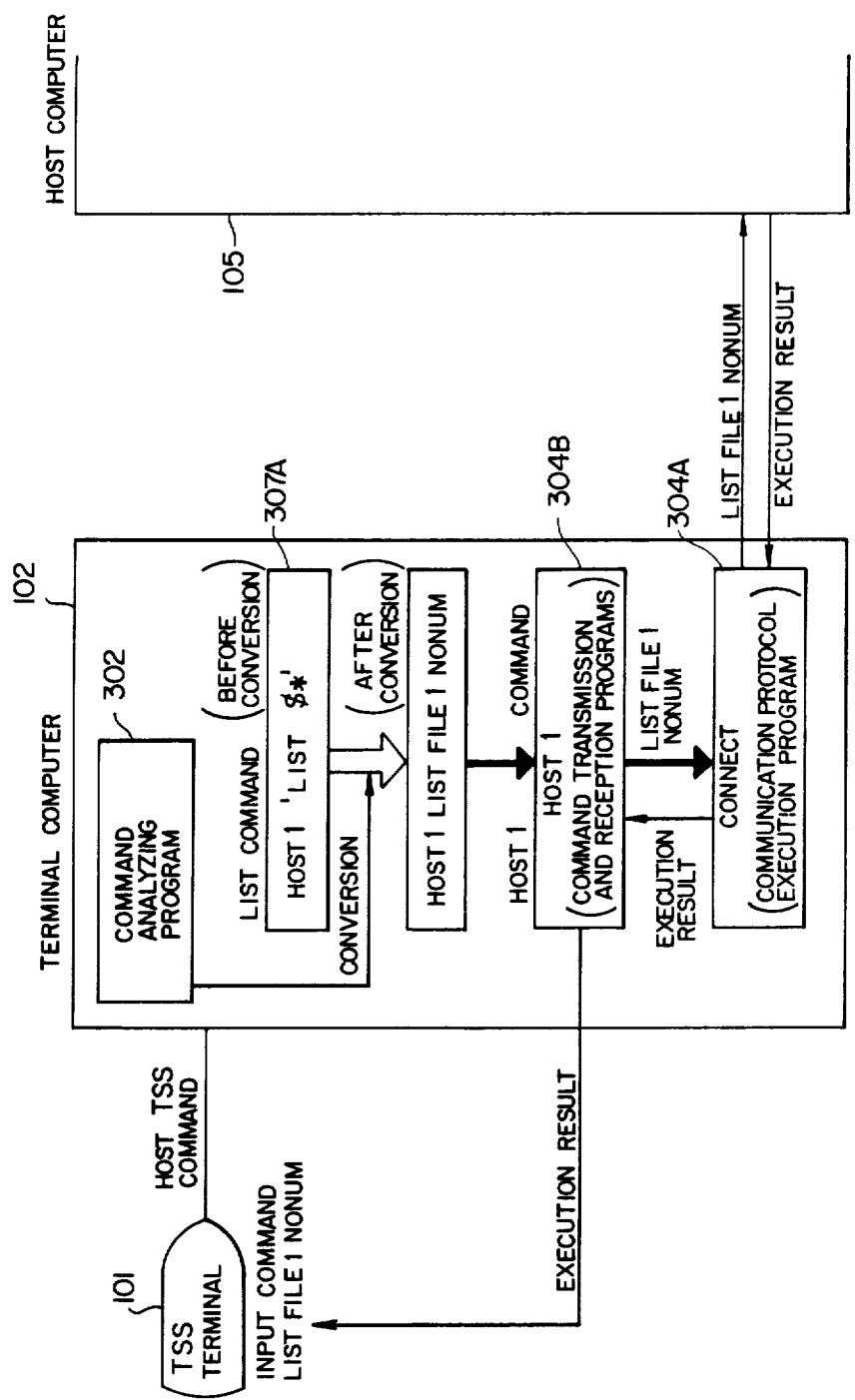
FIG. 4 is a diagram showing the summary of the operation in the present invention when a TSS command of the host computer was inputted from the TSS terminal of the terminal computer.

Corresponding to each of the TSS commands which are present on the host computer side, the host interactive commands to send those commands to the host computer are preliminarily created on the terminal computer side. As an example, to create the host interactive command in the UNIX TSS of the terminal computer VAX-11/780 corresponding to the LIST command to output the content of the file in the VOS3 TSS of the host computer HITAC M-180, the command program 307A in which host 1 LIST $* was written is created in the UNIX file, and "LIST" is named to this file. "host 1" is a name of the program which is included in the communication program 304 of FIG. 3 and is a program having the function to send the series of characters specified in the operand to the host computer. Now, the LIST command was created on the terminal computer side. As shown in FIG. 4, when

LIST FILE 1 NONUM is input from the TSS terminal of the UNIX, host 1 LIST FILE 1 NONUM is first executed as the LIST command on the UNIX side (the portion of $* is replaced by the series of characters of "FILE 1 NONUM" due to the function of the command analyzing program 302 of the UNIX). When this LIST command on the UNIX side is executed, the command

LIST FILE 1 NONUM is sent to the host computer 105, so that the LIST command, which is the TSS command of the host computer, is executed. Thus, the content of the file named FILE 1 is outputted from the host computer without line numbers (the line numbers are not added since NONUM was specified in the operand) and is sent to the terminal computer and then is outputted at the TSS terminal by the host 1 program 304B. The host 1 program is one command having the functions to send the series of characters of the operand to the host computer and to output the data to be sent from the host computer to the TSS terminal.

Next, a method of creating the host interactive command for the host TSS command having a subcommand is shown. As an example, to create the host interactive command on the UNIX side corresponding to the TEST command which is a symbolic debugger of the interactive type for the assembler program of the VOS3 TSS, the command program in which host 1-i TEST $* was written is created, and "TEST" is named to this file.

The difference between the method of creating the host interactive command and the LIST command in the former example is that "-i" was specified as an option of the host 1 command. This means that the TEST command is sent to the host computer and at the same time the beginning of the conversation is specified in the host 1 program. The host 1 program is not finished by only one transmission of the command and one reception of the execution result as in the case of the LIST command but repeats the transmission of the subcommand to the host computer and the reception of the execution result of the subcommand until the end of the conversation operation is inputted (for example, until the control key and alphabetic character D key which represent "end of file" are depressed in case of UNIX) by the user of the TSS terminal. The subcommand is directly read in the host 1 command without passing through the command analyzing program of the terminal TSS. When the end of conversation operation is input, the host 1 command is finished, and the next command line to be inputted by the user is again interpreted by the command analyzing program of the terminal TSS.

In this way, by creating the host interactive command on the terminal computer side corresponding to the TSS command of the host computer, the TSS command of the host computer can be used from the TSS terminal side of the terminal computer. In this example of the LIST and TEST commands, the host interactive commands have been defined on the terminal side so as to realize the command of the same specifications as the TSS command of the host; however, it is also possible to realize the command of which the specifications of the TSS command of the host computer were improved and to realize a new command in dependence upon the definition of the host interactive command. The host interactive command may be written as the command procedure using the command language of the terminal computer and may be described by mixing the host interactive command which has already been created therein. For example, once all of the host interactive commands to realize the same specifications with the TSS command of the host have been prepared, new commands can be defined by combining the terminal TSS command and the host TSS command (actually, the host interactive command on the terminal side) using the command language of the terminal computer. A part of the new commands created in this way is executed by the host computer and another part thereof is exeuted by the terminal computer. As described above, even in one command, the processings are carried out by distributing the functions. Since the host interactive command must be one of the TSS commands of the terminal computer provided as software, it can be described not only by the command language but also by the programming language generally in the same manner as in the case of creating the TSS command on the terminal computer side.

(2) Operation when inputting a command (2.1) hello command, bye command

The hello command serves to activate the program to execute the communication protocol between the terminal computer and the host computer (hereinafter, this program is called a connect program) and then to send the TSS session start command (e.g. in the case where the host is the VOS3 TSS, LOGON command, user name, password) of the host computer to the host computer. The connect program is a process in which the operation is always performed in accordance with the communication protocol with the host during the period from the time when it was activated by the hello command to the time when it is stopped by the bye command. Since the previously-described host 1 program also has a conversation with the host computer through the connect program, it is not necessary for the host 1 program to know the communication protocol with the host computer.

The bye command serves to send the end of TSS session command (e.g. in the case where the host is VOS3 TSS, LOGOFF command) of the host computer to the host computer and then to stop the connect program.

It may be constituted in such a manner that the hello and bye commands are automatically sent to the host computer upon starting and completion of the terminal computer TSS. For example, in the case where the terminal computer TSS is the UNIX (UNIX Version 4.1, University of California, Berkeley version), the hello command is merely written in the file named ".login" and the bye command is merely written in the file named ".logout". Due to this, in the UNIX TSS, the command in .login is automatically executed upon starting and the command in .logout is automatically executed upon completion, respectively.

(2.2) Host TSS command

When a command is inputted from the TSS terminal connected to the terminal computer, the input command line is analyzed by the command analyzing program of the terminal TSS. If the inputted command was the command of the host TSS, as previously described in item (1), even when the user thought that he had inputted the host TSS command, the terminal TSS command (host interactive command) is actually inputted due to the software system, so that the command is executed as usual by the terminal TSS. As a result of this, the command is sent to the host computer, where it is executed, and the executed result is then sent to the terminal computer and is outputted at the TSS terminal. This operation is substantially identical to that which occurs when the command of the host TSS is used from the viewpoint of the user.

This executing method is quite different from the conventional transparent host TSS in terms of the following points.

The command analyzing program which the terminal TSS has functions for the host TSS command (actually, host interactive command) in the same manner as the terminal TSS command. When the host TSS is used and when the terminal TSS is used, this makes it possible to work by the same interactive interface and to use the host TSS and the terminal TSS by combining them, and the like. In addition, it also makes it possible to newly define the host TSS command and use it on the terminal computer side.

For example, the command analyzing program of the UNIX has such functions as to switch over the input/output destinations of the TSS command; to simplify the re-input by memorizing the history of the command which has been inputted in the past; to transfer the execution of the command to the background; to add another denomination to the command name and utilize new command name which the user prefers; or the like. According to the method of the present invention, if the UNIX is used as the terminal TSS, the use method of the TSS utilizing these functions can be used by the same man machine interface as in the case where the UNIX is used even when the VOS3 TSS of the host computer is used as well as when the terminal TSS is used. The LIST command of the VOS3 TSS can be used as LIST FILE 1>output & in accordance with the UNIX type use method. This means "to output the result of the LIST command to the file named "output" and to execute it as a background command". The use methods of the symbol ">" to specify the output file and the symbol "&" to indicate the background execution are substantially identical to that of the UNIX. Although the LIST command is the VOS3 TSS command, it is also one command of the UNIX according to the configuration of the present invention; therefore, this enables such a use method of the host TSS.

Furthermore, in the next item (3), the effect will be shown in which the use methods of the host TSS and terminal TSS can be integrated by newly defining the host TSS command on the terminal computer side.

(3) Integration of the use methods of the host TSS and terminal TSS (3.1) Method of editing the text by the difference extraction If the processing of the text editor which is the command processor to be most frequently used in the TSS is distributed in the terminal TSS, this will provide a large effect to improve the response of the host TSS command by decreasing the load to the host computer.

Figure 5A:
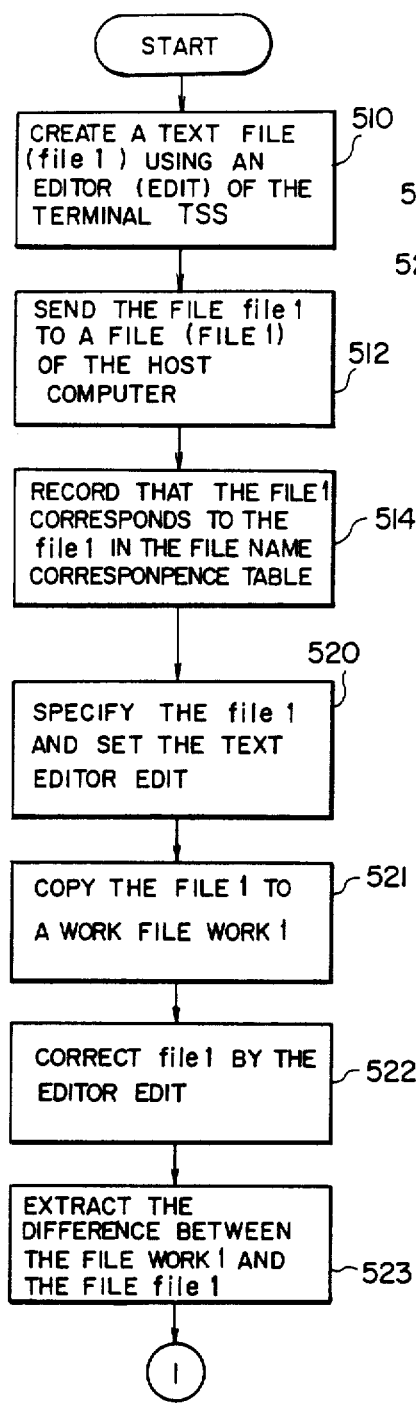
FIGS. 5a and 5b are flowcharts showing an example of a text editing method by the difference extraction according to the present invention.
Figure 5B:
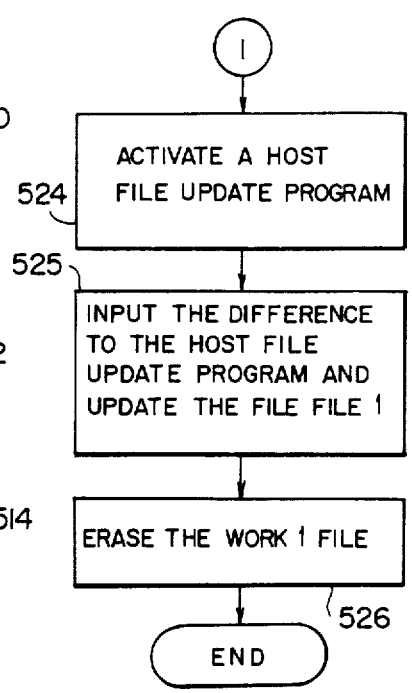

When one desires to perform the text edit on the terminal side, as an important problem to be considered, there is a problem of a text-correcting method. Namely, after the file which had finished editing was sent to the host computer, if that file is needed to be corrected again, a problem will occur about how it is corrected. Although it can be corrected by using the text editor of the TSS of the host computer, the user must study two kinds of use methods of the text editors on both the terminal side and the host side, so that it would make the burden too heavy for the user. Another method is available whereby the file is corrected by the text editor on the terminal side and the entire file is again sent. However, when the size of the file is large, it takes a long time to send the whole file again even if the file was corrected only in a small portion. Therefore, the present invention intends to provide a third method as shown in FIG. 5 in place of the above-described two methods. According to the method provided here, the user may study a use method of only the text editor of the terminal TSS.

After creating a text file (this file is temporarily named "file 1") using the text editor of the terminal TSS and sending it to the host computer (the file name in the host is temporarily referred to as "FILE 1"), the file on the terminal side is left without being erased (steps 510 and 512). The file "file 1" on the terminal side is considered to be the copy of the master file "FILE 1" on the host side. The correspondence of the names between the master file and copy file is recorded in a table with respect to the file transmission program (step 514).

It is preferable to create the file update program on the host side and the command procedure of the terminal TSS which extract the portion of the difference between the files before correction and after correction, and correct the master file "FILE 1" on the host side using the difference when the copy file "file 1" on the terminal side is corrected. The name of the command procedure on the terminal side is temporarily referred to as "edit". FIG. 6 shows an example of creation of the command procedure when the host side is VOS3 TSS and the terminal side is UNIX. The operation of "edit" to correct the file "FILE 1" of the host computer using the command procedure "edit" will be described hereinbelow.

When the user wishes to correct "FILE, 1", he specifies the copy file "file 1" of the terminal TSS and calls the terminal TSS command "edit" (step 520). The command procedure is also one command.

The edit command serves to temporarily copy the file "file 1" to the file "work 1". The host file name (i.e. FILE 1) corresponding to the file "file 1" is obtained from the file name correspondence table and is stored in the temporary area. Next, the text editor of the terminal TSS is invoked using the file name of the operand as "file 1" (in FIG. 6, the text editor named "vi" is invoked).

The user corrects the file "file 1" by the text editor on the terminal side (step 522). Upon completion of the correction work, when the user completes the text editor, the portion which presents a difference between the content of the file "file 1" after correction and the content of the file "work 1" before correction (this portion is called a difference) is extracted by the edit command (step 523). In FIG. 6, the difference is extracted using the diff command of the UNIX with "e" option (the function of the diff command will be described later). The difference between the files "file 1" and "work 1" is expressed as the columns consisting of the three kinds of operations of insertion, deletion and replacement of the text row (these are the subcommands of the file update program of the host) by the diff command. To activate the host TSS program (this program is provisionally named as "FEDIT") to update the master file of the host using this difference as the input data, the edit command permits the host interactive command to be executed and subsequently allows the difference which has been formerly obtained to be transmitted to the host TSS (step 524). The file name "FILE 1 of the host which has been preliminarily stored is specified as an operand of the command to activate the FEDIT program.

On the host side, the FEDIT program updates (at step 525) the file "FILE 1" of the host computer in accordance with the difference (subcommand of FEDIT). Finally, the edit command deletes the file "work 1" and finishes its operation.

With such a configuration as described above, the user may merely correct the file "file 1" of the terminal TSS (step 526) using the text editor of the terminal TSS.

If it is assumed that the differential amount will be large because of extensive correction of the copy file on the terminal side, there will be no problem even if the whole file after correction is sent by the file transfer command to update the master file of the host. Thereafter in order to correct the file again, the above-mentioned difference transfer method can be used. Namely, the difference transfer method can coexist with the method of sending the whole file.

FIG. 7 shows an example in which the difference of two files is extracted using the diff command of the UNIX with "e" option, which was cited in the explanation with respect to the above methods.

In FIG. 7, a reference numeral 601 denotes the content of the file (file name is "test1.f") before correction, and 602 the content of the file (file name is "test2.f") after correction. A numeral 603 denotes a result cf which the difference between the files "test1.f" and "test2.f" was obtained by the diff command. The difference is represented by two subcommands of 3d and 0a. 3d means "to erase the third line" and 0a means "to add a text to the 0th line (i.e. the head of the file)". The text line to be added is shown between the line immediately after 0a and the line of period (total of two lines are shown in 603). "test2.f" can be obtained by applying these subcommands to "test1.f". Therefore, the master file of "test1.f" can be updated as the content of "test2.f" by the program on the host side to execute the subcommands due to this difference.

It should be noted that the difference extraction is not obtained by simply comparing the two files one line at a time from the upper to the lower. Since the two files are compared such that the difference between the files becomes small, the data transfer amount to the host is reduced, causing the effect of sending only the difference.

(3.2) Method of making the use methods of file operation commands be common

The file operation commands to copy or erase the files, display the content, change the file names, display the file names as a list, etc. are the commands to be frequently used in the TSS, and it can be said that they are provided for most TSSs. It will be convenient and desirable for the user that he can commonly operate the TSS file on the host side and the TSS file on the terminal side by merely learning one kind of these fundamental commands. An embodiment of the method of enabling this by defining a command on the terminal side will be simply described using a copy command of the file as an example with reference to FIG. 8. For other file operation commands, it is possible to make the use methods which are common by defining a new host interactive command on the terminal side like the embodiment shown here.

It is now assumed that the host TSS is the VOS3 TSS and the terminal TSS is the UNIX. The use method of the command when copying the file by the VOS3 TSS is COPY <file name 1> <file name 2> and this means "to copy the file of the file name 1 to the file of the file name 2".

On the other hand, the use method of a command when copying the file by the UNIX is cp <file name 1> <file name 2> or cp <file name> ... <directory name>

The former means "to copy the file of the file name 1 to the file of the file name 2" and the latter means that "to copy all of the files specified by a series of file names under the directory specified by the directory name".

When copying the file of the host, a new cp command of which the cp command was expanded is also defined on the terminal side so that it is possible to use the same use method as the cp command of the terminal TSS, an example of which is shown in FIG. 9.

Figure 8:
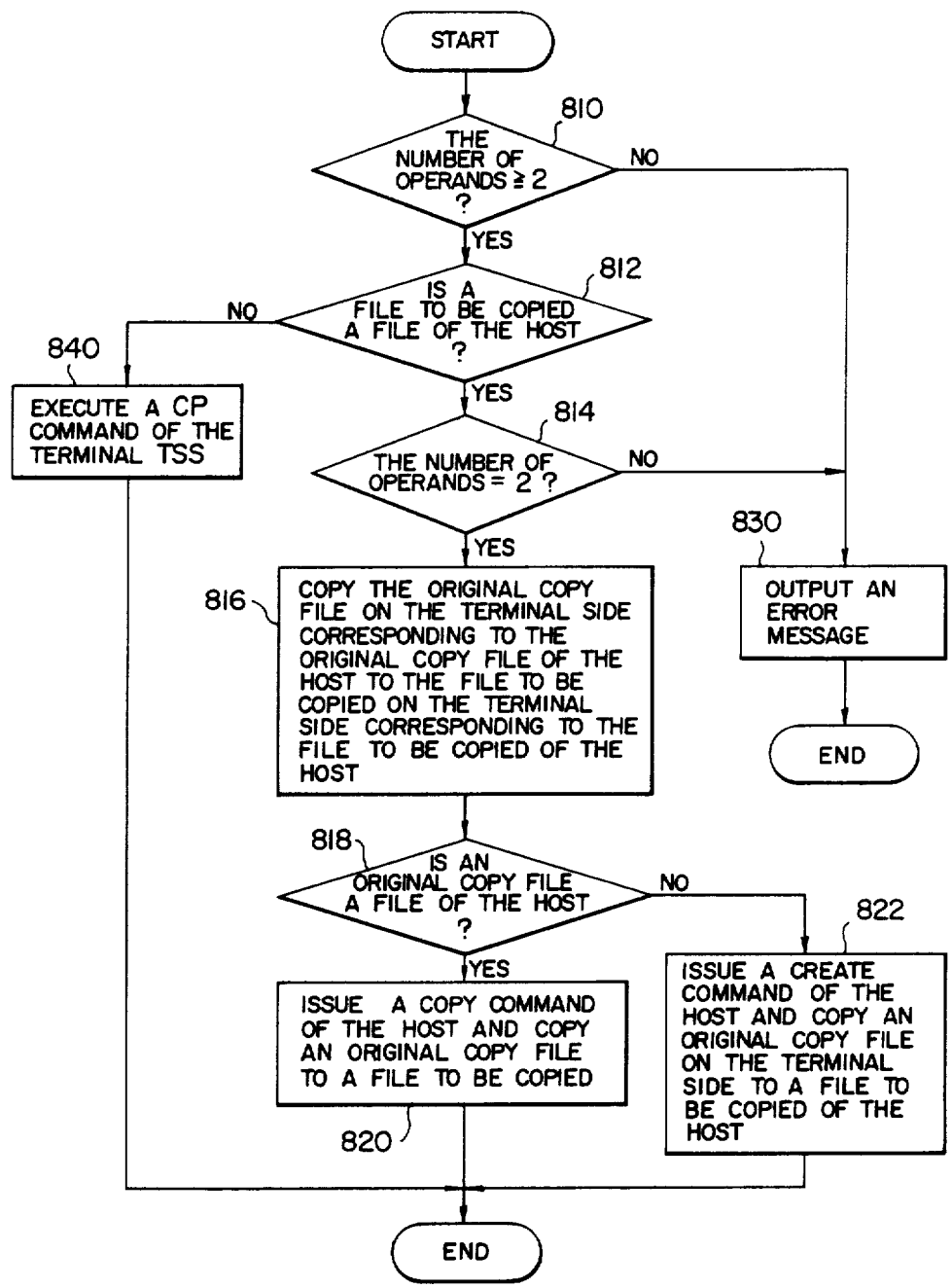
FIG. 8 is a flowchart showing an example of a method of making the using of a file operation command be common according to the present invention.

If the new cp command of FIG. 9 is used, it is possible to use the file name of the operand in which the file name on the host side and the file name on the terminal side are mixedly present. When the cp command is inputted, the terminal computer 102 determines whether or not the number of operands in the cp command is two or more (step 810), as shown in FIG. 8, and outputs an error message when the result is "NO" (step 830). If the number of operands is equal to or greater than two, the terminal computer 102 determines whether or not a file to be copied is the file on the host side (step 812). If the file to be copied is not the file on the host side, the process proceeds to step 840 in which the cp command of the terminal TSS is executed. When the file to the copied is the file on the host side, the terminal computer 102 determines whether or not the number of operands is equal to two (step 814). If the number of operands is two, the original copy file on the terminal side corresponding to the original copy file of the host is copied to the file to be copied on the terminal side corresponding to the file to be copied of the host (step 816), and it is thereafter determined whether or not an original copy file is a file of the host (step 818). In the case where the file on the terminal side is copied to the file on the host side, a CREATE command to store the file of the VOS3 TSS is activated to transfer the file on the terminal side to the CREATE command (step 820). When copying the file on the host side to the file on the terminal side, the copy file (refer to 3.1) on the terminal side corresponding to the master file is copied instead of copying the master file on the host side (step 822). Due to this, the transfer of the file from the host to the terminal becomes unnecessary. However, in the definition of the cp command of FIG. 9, if the host file is created using the text editor on the terminal side as mentioned in (3.1), it can be used since the copy file of the host file always exists on the terminal side also; on the contrary, if one desires to copy the host file which was created by another method, such as a method of creating by the program on the host side or the like to the terminal side, the copy file is needed to be created once on the terminal side by copying the host file to the terminal side using, for example, a file transfer command before using a new cp command. To omit this operation, when no copy file of the file of the host exists on the terminal side, a cp command may be created so as to transfer the file and to create the copy file on the terminal side.

In FIG. 9, /VOS3TSS/COPY and /VOS3TSS/CREATE are the host interactive commands which were created corresponding to the COPY and CREATE commands of the VOS3 TSS, respectively.

(4) Coupling of the host TSS and terminal TSS by a pipeline

With respect to the pipeline coupling between a plurality of computing systems to directly transfer the output of the host TSS command to the terminal TSS command as an input and to directly transfer the output of the terminal TSS command to the host TSS command as an input, the use method of the function will be first described using a practical use example, and then an embodiment of the mechanism to realize the function will be described.

(EXAMPLE 1)

LIST FILE 1 NONUM|grep CALL

This example shows the coupling of the LIST command of the host TSS (VOS3 TSS) with the grep command of the terminal TSS (UNIX) by the pipeline in which the TSS file (which includes a source program therein) named FILE 1 of the host is outputted by the LIST command without adding a line number, and in which in order to extract only the lines which include the CALL statement from its output data, only the lines including the series of character. of 'CALL' are extracted by the grep command and then they are outputted to the TSS terminal.

A vertical rod symbol "|" used in the above Example 1 is called a pipeline symbol and means that the output result of the command on the left side of this symbol is used as input data for the command on the right side and the two commands are successively executed. This notation was proposed in the UNIX TSS. One characteristic of the pipeline coupling is that two commands are executed in parallel, i.e. when the output of the former command (on the left side) is received, the latter command (on the right side) starts processing the data as much as received. Therefore, when the last portion of the output data of the former command is transferred to the latter command, the latter command would have finished almost all of the processing. The parallel processing of the commands as described above allows the execution time of the combined commands to be shortened, thereby obtaining an effect of improvement of the responsiveness. The human interface for the TSS will be also improved since the user need not specify the name of the file in which the output of the former command is temporarily stored.

It is permitted to couple three or more commands by the pipeline symbols.

Although the UNIX provides a function of using TSS commands of the UNIX by combining them in accordance with such a method, this function may be used by one of the TSSs in only one computer. The present invention provides a method of expanding this function to the pipeline between a plurality of TSSs in a plurality of computers.

As for the previously described Example 1, the LIST command of the host TSS can be coupled with the grep command of the terminal TSS by the pipeline symbol, and as soon as the LIST command transfers the output data to the grep command, the grep command sequentially and in parallel searches to see whether the character string of 'CALL' exists in each line of its output data (source program) or not and then outputs only the line including the series of characters 'CALL' to the TSS terminal. Therefore, when the LIST command finishes outputting the TSS file (FILE 1) of the host computer, the grep command will also have finished searching the line including the series of characters 'CALL'. Consequently, if the combination command, shown in the previously described example, which couples the LIST command with the grep command by the pipeline is defined as a host interactive command (at this time, the operand of the command can be treated as a parameter), a new host command having a compound function can be realized with the same response speed as that of the LIST command.

In the method to be provided according to the present invention, in contrast with Example 1, it is also possible to use the output of the command of the terminal TSS as the input of the command of the host TSS. Thus the order in coupling of the host TSS command and the terminal TSS command by the pipeline is not limited in particular.

The mechanism to couple the host TSS with the terminal TSS by the pipeline will be described hereinbelow.

It is now assumed that the command line command 1 | command 2 of which two TSS commands "command 1" and "command 2" were coupled by the pipeline symbol was inputted from the TSS terminal (command 1 and command 2 may include operands).

The command analyzing program provides a buffer area called a pipe file on the main memory and allocates the pipe file as an output file of the execution result of command 1, instead of allocating the output file of command 1 to the TSS terminal. It also allocates the input file of command 2 to the above-mentioned pipe file and invokes command 1 and command 2. The above-mentioned read and write operations of the data of the pipe file are synchronized by the operating system. That is to say, when command 2 tries to read the data from the pipe file, and if no data exists in the pipe file, command 2 will stand by the execution until the data enters the pipe file. On the other hand, when command 1 tries to write the data in the pipe file, if the data cannot be written since the pipe file is full, command 1 will stand by the execution until a space area appears in the pipe file. In this way, since the executions of command 1 and command 2 are synchronously controlled by the operating system through the input/output to the common buffer, the two commands coupled by the pipeline can act in parallel.

The functions to be performed by the command analyzing program and the operating system which were described above are supported, for example, in the UNIX. Thus, when the UNIX is used as a terminal TSS, as shown in FIG. 10, a mechanism should be added whereby the reception and transmission of data with the host computer are performed through the memory buffer 320 in which the input/output is synchronously controlled.

In the UNIX there are two kinds of memory buffers, that is, a pipe file and a multiplexer file, as memory buffers in which the input/output are synchronously controlled. These files enable the high speed reception and transmission of data between commands since the areas are allocated in the main memory and accesses to the secondary memories (e.g. discs) hardly occur for the data input/output.

Figure 10:
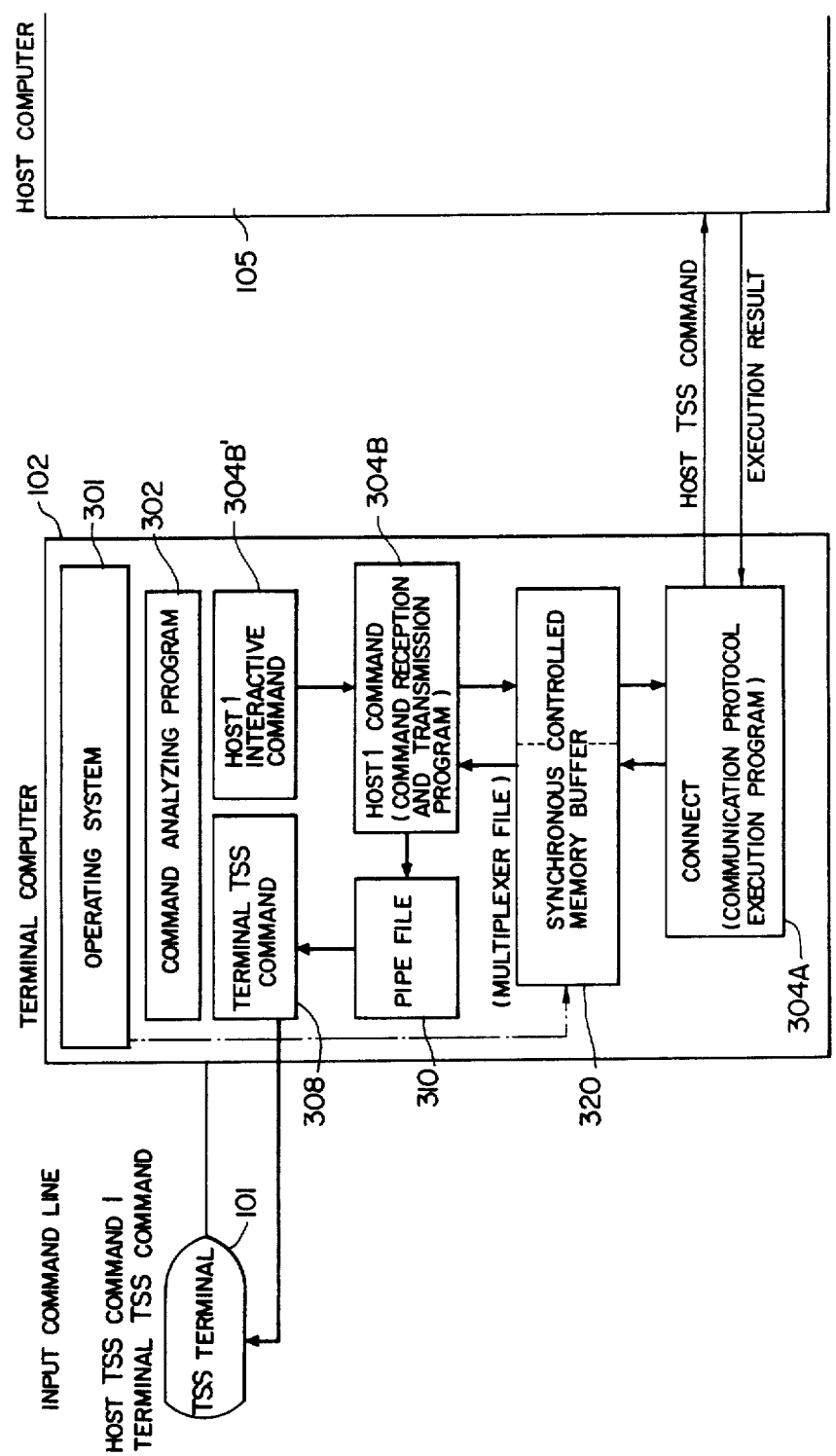
FIG. 10 is an explanatory diagram showing a mechanism to couple the host computer TSS and the terminal computer TSS by the pipeline according to the present invention.

FIG. 10 shows the operation when the host TSS command (former) was coupled with tha terminal TSS command (latter) by the pipeline.

The host interactive command defined in response to the host TSS command 304B, is executed; the host 1 command 304B (the command to send the TSS command to the host computer and receive its execution result) acts; the command line to be transmitted to the host is transferred to the connect program 304A (the program to execute the communication protocol determined between the host computer and the terminal computer) via the multiplexer file 320; the command is executed by the host computer; and the result is received by the connect program and is transferred to the host 1 command 304B via the multiplexer file (for improvement of efficiency, two multiplexer files are used for transmission and reception). The host 1 command 304B outputs the execution result to the pipe file 310 allocated by the command analyzing program 302.

The latter terminal TSS ccmmand in the two TSS commands coupled by the pipeline symbol reads the execution result of the host TSS command from the pipe file as the input data and processes that and then outputs the execution result to the TSS terminal.

In this way, the coupling function of the host TSS command and the terminal TSS command by the pipeline is realized by coupling the host interactive command (this is one of the terminal TSS commands) with the terminal TSS command by the pipeline. At this time, in order not to lose the effect of the parallel execution of the command, the memory buffer (in the UNIX, the multiplexer file) of which the synchronous control by the operating system is done is also used for the reception and transmission of the data with the host communication program. The memory buffer is allocated by the "hello" command for activating the connect program. The buffer is released by the "bye" command for stopping the connect program.

On the other hand, the mechanism described above also makes it possible to transfer the execution result of the terminal TSS command as the input of the host TSS command (in this case, the execution result of the terminal TSS command is transferred as the input data of the host interactive command through the pipe file). It is a problem peculiar to the UNIX that either of the pipe file or multiplexer file in the memory buffers to be synchronously controlled is used, and generally any memory buffer of which the input/output are synchronously controlled may be used. For the pipe file of the UNIX, a range of the processes which can be accessed is limited and the pipe file is commonly utilized in the range of the processes which are in relation of parent-child or that of brothers. On the contrary, there is not such a limitation for the multiplexer file. For the terminal TSS commands of the UNIX, the pipe file can be commonly used since they commonly have the command analytic program as the parent process.

FIG. 11 shows an example of the use result of the pipeline coupling mechanism when the VOS3 TSS is used as the host TSS and the UNIX is used as the terminal TSS. In FIG. 11, a reference numeral 901 shows an example in which the host TSS command was used as it is. In 901, the first line is the input command line (% symbol is an input prompting character) and the second and subsequent lines indicate the execution results of the commands. A list of member files included in the file of 'VOSC.data' is indicated here by a LISTDS command of the VOS3 TSS. The attribution information and other information of the file of VOSC.data is outputted to the first six lines of the output results. A list of the names of the member files stored in the file VOSC.data is outputted to the seventh and subsequent lines. A numeral 902 of FIG. 11 shows an example which combines the VOS3 TSS command and UNIX command by the pipeline when one desires to obtain only the names of the member files as the information and also to know the number of member files. In 902, the first line is the input command line and the second and subsequent lines indicate the execution results of the commands. The LISTDS command of the VOS3 TSS, and the sed command and num command of the UNIX are coupled by the pipelines and are used. The execution of the LISTDS command first shows the execution results at 901 to be outputted from the host computer, but they are immediately transferred to the sed command of the UNIX (on the main memory of the terminal computer), therefore from the first line to the sixth line are erased. Subsequently, the results are transferred to the num command of the UNIX and line numbers are added to each line. These processings are executed in parallel, so that the second and subsequent lines in 902 of FIG. 11 are outputted to the TSS terminal. Now, only the names of the member files that were wanted are indicated with the line numbers associated and this output can be so easily seen that it is possible to immediately check the total number of member files.

As described above, the execution results of the commands are immediately processed by other commands coupled by the pipeline, thereby obtaining the desired results.

For the user who always uses the LISTDS command in the manner as shown in 902 of FIG. 11, if LISTDS $1 m|sed '1,6d'|num has been preliminarily written in the UNIX file using the portion (VOSC.data) of the file name as a parameter and has named its file 'listds', when he inputs a command such as listds VOSC.data the output result in 902 of FIG. 11 is obtained. Thus, the listds command is created as a new command of which the specifications are an extention of that of the LISTDS command of the VOS3.

(5) Simultaneous interaction with a plurality of host systems

In this embodiment, it was assumed so far for simplicity of explanation of the mechanism of the present invention that only one host computer is used. Next, the method in the case where there are a plurality of host computer systems will be described.

Figure 12:
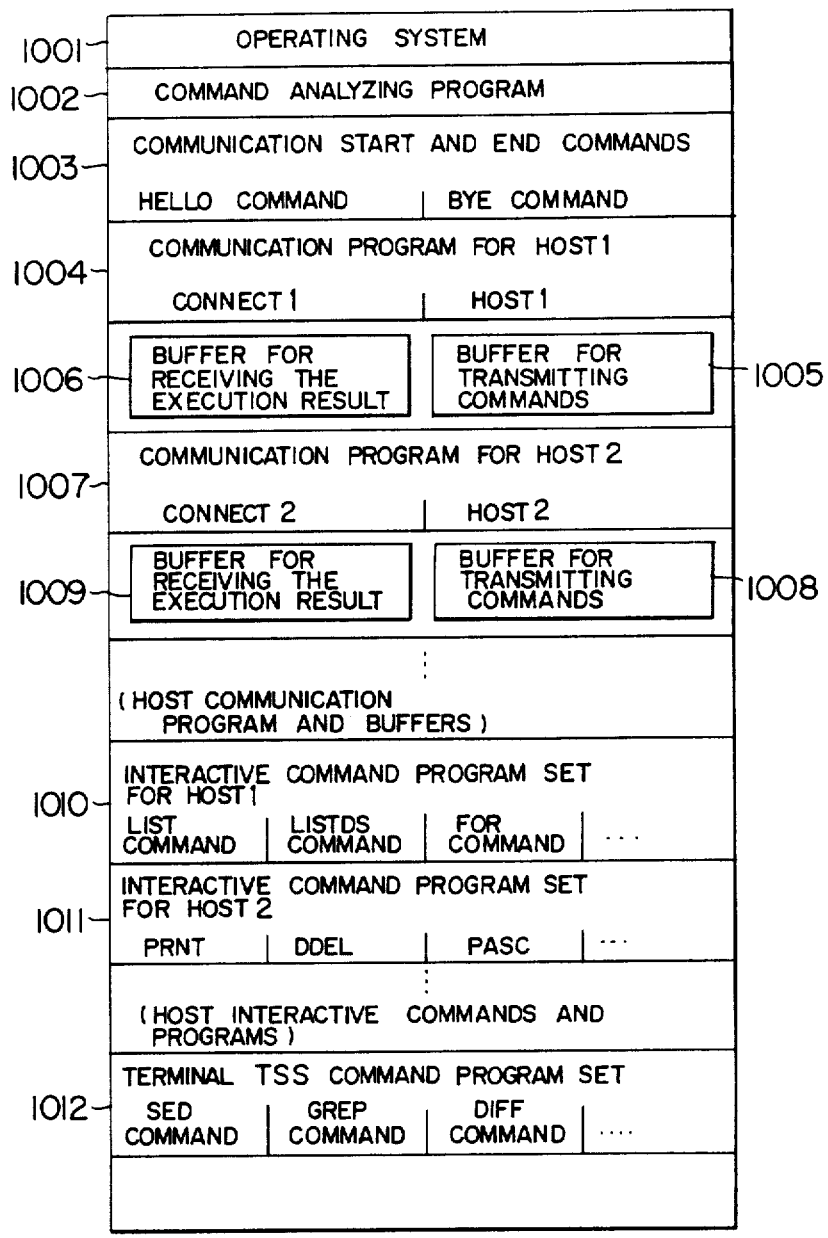
FIG. 12 is an explanatory diagram showing a memory map in the main memory of the terminal computer which is necessary to enable the simultaneous conversation with a plurality of host computers according to the present invention.

FIG. 12 shows a memory map in the main memory of the terminal computer to realize the simultaneous conversation with a plurality of host computers. The following are individually provided on the terminal computer side in correspondence with the host computer system.

(a) Host communication programs (connect, host)
(b) Buffer for transmitting commands and buffer for receiving the command execution result
(c) Host interactive command program group It is now provided that the names of the host computer system and the interactive system (e.g. TSS or online system) which operates in the host computer system can be specified in the operands of the hello and bye commands. Each of the hello and bye commands serves to allocate and release the buffer for communicating with the host system specified by the operand and to activate and stop the host communication program. For example, when the host 1 was specified by the operand of the hello command, the connect 1 program is activated. After the conversation with the host 1 was enabled in this way, when the hello command is again used and the host 2 is then specified, the connect 2 program is activated. Thus, the simultaneous communication with the two host systems of the host 1 and host 2 is enabled.

When the host TSS command is inputted from the TSS terminal, the host interactive command which has been defined in response to the host TSS command is executed (the constitution to uniquely determine the corresponding host interactive command will be described later). For example, host 2 'TYPE $*' is preliminarily written in the host interactive command in order to uniquely determine which command for transmitting and receiving the host command is activated. In the above example, "host 2" command is activated and the host TSS command is sent to the second host computer named host 2.

There may be a case where the commands with the same command name exist among a plurality of host TSSs or between the host TSS and the terminal TSS. In such a case, a constitution is adopted whereby the user can freely change the retrieval order of the commands, and the command names are retrieved in accordance with the order which was set by the user, thereby executing the command which was found first. For example, in the case where the terminal TSS is the UNIX, the user can freely set the retrieval order of the directory in which the command names have been stored and can change the retrieval order while the TSS is being used. Therefore, when the commands having the same name exist, the user can select that one to which the first priority is given and also can charge the order. If one desires to use directly (without changing to the first priority) the commands having the same name which have the second and less significant priority, there is a method of inputting, for example, such as the following:

host name/interactive system name/command name.

With the previously described constitution, it is possible to simultaneously call an number of host systems and to use arbitrary TSS commands.

(6) Simultaneous use of a plurality of TSS sessions

Generally, the duration after a start command of the TSS (for example, LOGON command in case of the VOS3 TSS) is inputted until an end command (LOGOFF command in case of the VOS3 TSS) is inputted is called a TSS session time. During this interval, it is possible to have a conversation with the computer using the TSS command from the terminal. In case of the VOS3 TSS, to enable the conversation, when the start command of the TSS is inputted, one interactive job (this is called a TSS session job) is produced in the computer and each of the TSS commands to be inputted is executed. Whe the end command of the TSS is inputted, this job disappears.

In most of the TSSs including the VOS3 TSS, there is a limitation such that one session is available for one terminal, so that it is impossible to simultaneously have a conversation with a plurality of TSS session jobs from one terminal (i.e. one user). The input TSS commands are sequentially executed because of a single job. That is to say, the user cannot allow the computer to execute simultaneously a plurality of TSS commands.

A method is shown below whereby even when there is inherently a limitation such that one session is provided for one user with respect to the host TSS as described above, a plurality of ISS sessions are simultaneously accessed and a plurality of TSS commands can be executed in parallel using the mechanism of the present invention.

Even when there is actually only one host computer, it is regarded as if there were a plurality of host computers, and a plurality cf sets of host interactive command groups are provided for the terminal computer side (in the case where the terminal TSS is the UNIX, it is sufficient to provide a plurality of directories). A plurality of host TSSs are accessed using the previously mentioned mechanism for enabling the simultaneous conversation with a plurality of host systems. By using a method whereby a plurality of host TSSs accessed were the same system by chance, it is possible to access a plurality of sessions of the same TSS and to simultaneously use them. In other words, the simultaneous use of a plurality of TSS sessions is a particular case of the simultaneous conversation with a plurality of host systems.

The simultaneous use method of a plurality of TSS sessions mentioned here will be substantially identical to that of a plurality of TSS terminals simultaneously used from the host system side even if the host TSS seems to be used by the multijob from the user side.

Therefore, when the above method is used, one user simultaneously occupies a plurality (corresponding to the number of TSS sessions) of TSS lines for connecting the host computer with the terminal computers. Although this can be realized using a plurality of lines actually, for example when the operating system of the host computer is the VOS3, a virtual terminal access method (VTAM) is known in which one physical line is logically regarded as a plurality of lines, and the use of this method also enables the number of lines to be actually installed to be reduced.

Problems which can be solved by the simultaneous use of a plurality of TSS sessions will be described hereinafter.

Generally, when the user uses the TSS, even when he has many works that he wishes to handle, there may be a case where he must wait whether he likes it or not since only one command is executed at a time. When the terminal side TSS has a function for allowing the commands to be executed in the background like the UNIX (In the UNIX, when a symbol & is added after the command line, its command is executed as a background job), the use method of the TSS is enabled such that some of the works which require a long execution time such as the compilation and execution of a large scale program are executed in parallel in the background by the host computer with a great computing ability using the function of the simultaneous use for a plurality of TSS sessions (the host TSS commands are transferred to the background by merely executing the host interactive commands in the background), and the preparation work for the next work is done by the terminal TSS in the foreground. Therefore, this results in a reduction of the waiting time of the user and an improvement in effect of the work.

Of course, even when the terminal TSS does not have a background executing function, the parallel execution (in the foreground) of the host TSS commands enables the work efficiency to be improved.

(7) Coexistence with remote batch

As is obvious from the description so far, the method for interacting with the host computer in accordance with the present invention is a mechanism which is quite independent from the coupling with the host computer by the remote batch, so that by adding the mechanism of the present invention to the remote batch type distributed system, both of them can be allowed to coexist. If the host computer and the terminal computer are coupled with both RJE (remote job entry) lines and TSS lines and the operating system (e.g. UNIX) supporting the multitask function is used on the terminal computer side, the conversation with the host TSS will be enabled even while the reception and transmission of a large amount of data are being performed in the remote job entry system.

According to the present invention, by distributing a part of the TSS processing to the terminal computer side, it is possible to prevent the deterioration of the response speed of commands which is caused by the load concentration of the loads, and it is possible to use the host computer TSS and terminal computer TSS simultaneously and in a multiplex manner by combining the TSS commands from one TSS terminal side.

Owing to the various functions provided by the present invention, such as the parallel execution of the host TSS and terminal TSS commands, simultaneous conversation with a plurality of host computers, simultaneous use of two or more TSS sessions, etc., the TSS user can simultaneously perform many works in parallel, thereby raising the "human performance" which is significant in the TSS.

Furthermore, even in the TSS using the operating system which gives a priority to the use efficiency of the computer, if the distributed TSS which employs the method of the present invention is constituted using the operating system to be used only for the TSS which gives a priority to the human interface, it is possible to introduce the excellent man-machine interface of the terminal side TSS into the host side TSS, and to improve the human interface and interactive capability of the TSS. In addition, the TSS commands which the user desires can be used by defining them on the terminal computer side. In this case, by using the function for coupling the TSSs of two computers by the software pipeline, which function is provided by the present invention, the output of the TSS command can be processed in realtime on the terminal side and it is possible to realize a wide functional command having a composite function of the host TSS and the terminal TSS commands with a high speed response.

Furthermore, the use of the simultaneous interactive function for plural host computers, which function is provided by the present invention, enables a number of computers from a large computer to a microcomputer to be used with a common use method.

We claim:

1. In a time-sharing computer system including a host computer system which operates in response to a host TSS command, a terminal computer system which is connected to said host computer system through a line and operates in response to a terminal TSS command, and a plurality of terminals which are connected to said terminal computer system for operating said host computer system and said terminal computer system in an interaction mode, said terminal computer system comprising:

first means for storing a first set of programs each of which defines an operation of said terminal computer system to be executed in response to a respective terminal TSS command inputted from one of said terminals;

second means for storing a second set of programs each of which, when executed, produces a series of character codes to be sent as a host TSS command to said host computer system in response to a corresponding host TSS input command inputted from one of said terminals and transfers the execution result of the host TSS input command by the host computer to the one of said terminals to which the host TSS input command was inputted by a user;

command analyzing means for selecting within said first and second sets of programs a group to be executed in response to a terminal TSS command or a host TSS input command received from one of said terminals;

means responsive to said analyzing means for executing said selected program; and communication means for transmitting character codes, produced by execution of a program of said second set of programs, as a host TSS command to said host computer system through said line between said terminal computer system and said host computer system and for receiving the result of operation of said host computer system in response to the host TSS command;

wherein each of said terminals receives the execution results of operation in a host interaction mode in response to the inputting of a host TSS input command, and the execution results of an operation in a terminal interaction mode in response to inputting of a terminal TSS command without the need for switching of the interaction mode of operation of said terminal computer system.

2. A time-sharing computer system according to claim 1, wherein said terminal computer system further includes buffer memory means for storing temporarily the result of an operation by the terminal computer system or host computer system, and wherein, said command analyzing means includes means responsive to a compound command, comprising a first command and a second command, inputted from one of said terminals in which the result of an operation in response to said first command is to be processed in accordance wtih an operation requested by said second command, for designating said buffer memory means as an output file for the result of operation in response to said first command and as an input file for the result of operation in response to said second command.

3. A time-sharing computer system according to claim 2, wherein said communication means includes means connected to said buffer memory means for transmitting the content stored in said buffer memory means to the host computer system.

4. A time-sharing computer system according to claim 2, wherein said communication means is connected to receive the result of operation in said host computer system and to supply said result to said buffer memory means.

5. A time-sharing computer system according to claim 2, wherein said terminal computer system further includes means, connected to said buffer memory means and said execution means for synchronizing the operations of reading and writing of said buffer memory means with each other by delaying execution of the program which corresponds to said second command when said buffer memory means is empty and by delaying execution of the program which corresponds to said first command until an unoccupied area is produced in said buffer memory means, when said buffer memory means is occupied.

6. A time-sharing computer system according to claim 1, wherein said terminal computer system creates a TSS session job each time a start command of a TSS operation is inputted from one of said terminals, said terminal computer system including a plurality of pairs of said communication means and said second set of programs, and said command analyzing means includes means for allocating said plurality of pairs of said communiction means individually to each TSS session job to said host computer system, whereby use of a plurality of the TSS sessions is permitted for the same host from the same terminal.

7. A time-sharing computer system according to claim 6, wherein said terminal computer system is connected to a plurality of the host computer systems through respective lines, and said command analyzing means includes means for effecting separate execution of said second sets of programs for every host computer, so as to permit parallel interation between one of said teminals and a plurality of host computers.

8. A method for controlling a time-sharing computer system including a host computer system which performs data processing in response to a host TSS command, a terminal computer system which is connected to said host computer system through a line and operates in response to a terminal TSS command, and a plurality of terminals which are connected to said terminal computer system for operating said host computer system and said terminal computer system in an interactive mode, said method comprising the steps of:

storing first and second sets of programs in the terminal computer system, each of the programs in the first set defining an operation of said terminal computer system to be executed in response to one of a plurality of terminal TSS commands inputted from said terminals, and each of the programs in the second set defining an operation of said terminal computer system for producing a series of character codes to be sent as a host TSS command to said host computer system in response to a host TSS input command inputted from one of said terminals and for transferring the operation result of the host TSS input command by said host computer system to the one of said terminals to which the host TSS input command was inputted by a user;

transmitting a start command for a host TSS operation from said terminal computer system to said host computer system to produce a state wherein execution of an interactive job is initiated between the terminal and the host computer system;

selecting a program from said first and second sets of programs indicaed by a command inputted from the terminal, and thereafter carrying out the program indicated by the input command; and when said input command is a host TSS input command, transmitting the host TSS command to said host computer system and transferring the execution results in the host interaction mode to the terminal, and when said input command is a terminal TSS command, operating the terminal computer system in a terminal TSS mode despite the fact that the terminal is in a host interactive mode.

9. A method according to claim 8, further including the steps of, receiving a compound command from the terminal, said compound command including a combination of a terminal TSS command and a host TSS input command, carrying out a first porgram which is indicated by one of said commands and processing the result of carrying out said first program with a second program which is indicated by the other of said commands.

10. A method according to claim 8, wherein said terminal computer system includes a text editor, and a program for extracting portions of text by which a text before correction and a text after correction differ from each other and for generating a series of commands for indicating to said host computer the content of said differing portions, and said method further includes the steps of:

producing a copy of a file, when a terminal TSS command calling for said text editor and designating said file is inputted;

correcting said file in accordance with an input operation designated from the terminal;

carrying out said program for extracting said portions by which said texts differ in response to an indication of an end of correction from the terminal and for producing a series of commands which show portions by which said copy and the file differ after correction; and transmitting a host TSS command for initiating a file updating operation in the host computer, as well as a command and data for indicating the content of a correction to be made in updating said file and designating the file at the host.

* * * * *